(12) United States Patent  
Porter et al.

(10) Patent No.: US 8,005,567 B2  
(45) Date of Patent: Aug. 23, 2011

(54) METHOD AND CONTROL SYSTEM FOR GENERATING MACHINE TOOL CONTROL DATA

(75) Inventors: Stephen P Porter, Bristol (GB); Christopher N. R. Wilson, Flintshire (GB); Robert J Lloyd, Cheshire (GB); Ian P Williams, Mold (GB); Stephen A Banks, Prestatyn (GB)

(73) Assignee: Airbus Operations Limited, Bristol (GB)

( * ) Notice: Subject to any disclaimer, the term of this patent is extended or adjusted under 35 U.S.C. 154(b) by 996 days.

(21) Appl. No.: 10/380,418

(22) PCT Filed: Aug. 31, 2001

(86) PCT No.: PCT/GB01/03869  
§ 371 (c)(1),  
(2), (4) Date: Apr. 2, 2003

(87) PCT Pub. No.: WO02/23293  
PCT Pub. Date: Mar. 21, 2002

(65) Prior Publication Data  
US 2003/0171841 A1  Sep. 11, 2003

(30) Foreign Application Priority Data

Sep. 14, 2000 (GB) .................................. 0022578.9  
May 24, 2001 (GB) .................................. 0112559.0

(51) Int. Cl.  
G06F 19/00 (2011.01)

(52) U.S. Cl. ........................ 700/182; 700/98; 700/179

(58) Field of Classification Search .................. 700/98, 700/159, 160, 179, 180, 182, 95, 97, 103, 700/117, 118  
See application file for complete search history.

(56) References Cited

U.S. PATENT DOCUMENTS 4,590,578 A   5/1986   Barto, Jr. et al.  
(Continued)

FOREIGN PATENT DOCUMENTS

EP   0 337 122   10/1989  
(Continued)

OTHER PUBLICATIONS

Henderson and Musti, "Automated Group Technology Part Coding From a Three-Dimensional CAD Database", Journal of Engineering for Industry 110:278-287 (1988).

*Primary Examiner* — Charles Kasenge  
(74) *Attorney, Agent, or Firm* — Nixon & Vanderhye P.C.

(57) ABSTRACT

A control system (41) comprises a control program (42) which accesses a stored database (43) holding a predefined set of rules for performing predetermined machine tool operations, from which rules computer instructions can be derived for controlling an NC machine tool. A solid model (44) of a component to be manufactured is input to the control program (42). The solid model (44) is in the form of a computer model programmed using the International Geometry Export Standard (IGES). In operation, the control program (42) performs a feature recognition operation on the IGES data to identify geometric features present in the solid model (44). Having identified the geometric features present, the control program (42) uses the set of rules in the database (43) to generate control data in the form of a composite set of computer instructions for working the features of the component represented in the solid model (44).

39 Claims, 7 Drawing Sheets

U.S. PATENT DOCUMENTS

| | | | | |
|---|---|---|---|---|
| 4,885,836 A | * | 12/1989 | Bonomi et al. | 29/524.1 |
| 4,998,206 A | | 3/1991 | Jones et al. | |
| 5,033,014 A | * | 7/1991 | Carver et al. | 700/182 |
| 5,189,626 A | * | 2/1993 | Colburn | 700/182 |
| 5,249,135 A | * | 9/1993 | Fujita | 700/179 |
| 5,289,382 A | * | 2/1994 | Goto | 700/183 |
| 5,293,479 A | * | 3/1994 | Quintero et al. | 703/1 |
| 5,398,537 A | * | 3/1995 | Michalewski et al. | 29/243.54 |
| 5,560,102 A | | 10/1996 | Micale et al. | |
| 5,581,676 A | | 12/1996 | Ueno | |
| 5,596,504 A | * | 1/1997 | Tata et al. | 700/120 |
| 5,615,474 A | | 4/1997 | Kellner et al. | |
| 5,796,618 A | * | 8/1998 | Maeda et al. | 700/182 |
| 5,813,110 A | * | 9/1998 | Arntson et al. | 29/243.54 |
| 5,815,400 A | * | 9/1998 | Hirai et al. | 700/182 |
| 5,850,343 A | | 12/1998 | Nakamura | |
| 5,963,451 A | * | 10/1999 | Seki et al. | 700/182 |
| 6,240,332 B1 | * | 5/2001 | Buttrick et al. | 700/169 |
| 6,263,252 B1 | * | 7/2001 | St. Ville | 700/98 |
| 6,314,630 B1 | * | 11/2001 | Munk et al. | 29/407.01 |
| 6,478,722 B1 | * | 11/2002 | Graham et al. | 29/243.53 |

FOREIGN PATENT DOCUMENTS

| | | |
|---|---|---|
| EP | 0 355 454 | 2/1990 |
| EP | 1 003 087 | 5/2000 |
| GB | 2 224 371 | 5/1990 |
| JP | 7-84622 | 3/1995 |
| JP | 8069310 | 3/1996 |
| WO | 97/34733 | 9/1997 |
| WO | WO 97/34734 | 9/1997 |
| WO | WO 00/00872 | 1/2000 |

* cited by examiner

| Attr. No | Attribute Description | Attr. ID | Data Type | Data Format |
|---|---|---|---|---|
| 21 | Fastener Identity | Fid | Test | NAS1321AD8E10 |
| 22 | Stack Thickness | Stk | Real | Value in mm |
| 23 | Total Thickness | Tot | Real | Value in mm |
| 24 | Throat Datum Offset | Tdo | Real | Value in mm |
| 25 | Y Distance | Ydist | Read | Value in mm |
| 26 | Web Datum Offset | Wdo | Real | Value in mm |
| 27 | Crown Datum Offset | Cdo | Real | Value in mm |
| 28 | Flange Datum Offset | Fdo | Real | Value in mm |
| 29 | Fastener Length | Type | Test | Rivet or Bolt |
| 30 | Fastener Diameter | Diameter | Real | Value in mm |
| 31 | Fastener Length | Length | Real | Integer |
| 32 | Cold Working | Cwk | Real | Integer 0 or 1 |
| 33 | Stringer Flange Thickness | Stfl | Real | Value in mm |

METHOD AND CONTROL SYSTEM FOR GENERATING MACHINE TOOL CONTROL DATA

This application is the US national phase of international application PCT/GB01/03869 filed 31 Aug. 2001, which designated the US.

This invention relates to a method and control system for generating control data for a numerically-controlled machine tool.

Numerically-controlled (NC) machine tools, sometimes referred to as computer numerically-controlled (CNC) machine tools, are widely used in industry to manufacture and/or operate on engineering components. Such machine tools are controlled by a computer system which is programmed to operate the tool in a predetermined way. As a general example, NC milling and drilling machines are commonly used to shape and configure complex mechanical components according to programmed instructions. As a more specialised example, NC riveting machines are used in the aerospace industry to fix aircraft wing skins to an underlying wing structure. NC machine tools allow complex machining tasks to be carried out safely, repeatedly and with high precision.

The task of programming modern NC machine tools is a highly skilled and time consuming task. In situations where the machining head of an NC machine has many axes of freedom in which to move, and the geometry of the underlying workpiece is complex, the amount of data required to be programmed at each machining location, and between machining location, is considerable. Taking the example of the wing assembly mentioned above, a typical NC programming operation involves some on-line digitising. In other words, the NC machine is taken out of its production routine in order to record the location of rivet holes from a 'master' part which has been built manually. The process involves the programmer driving the machine over each location and centralising the machine head using a camera. The co-ordinates of each location are stored as raw NC data. This data then has to be edited manually to add machine cycle commands for installing the rivets, and for controlling the intermediate movements of the machine head.

Whilst some Computer-Aided Design (CAD) packages aid in verifying the location of particular component features, programming the operating procedure of the machine to produce the component still requires a large amount of time and expertise on the part of the programmer. A highly expensive machine tool may have to be taken off-line for months whilst programming takes place.

Since the programming task is highly complex, NC programming personnel must be very skilled which implies long periods of specialised training. If a company wishes to use a new NC tooling system, they will have to spend a considerable amount of time training new programming personnel. Even with specialised training, however, the programming process is prone to human error which can be costly in terms of both time and expense.

According to a first aspect of the present invention, there is provided a method of generating control data for a numerically-controlled (NC) machine tool, the method comprising: providing a predefined set of rules for performing predetermined machine tool operations, from which rules computer instructions can be derived for controlling the NC machine tool; providing a computer model representing a component to be worked by the machine tool, the computer model including information relating to geometric features of the component; automatically identifying, from the computer model, geometric features of the component, and identifying one or more of the predetermined machine tool operations suitable for working the identified features of the component; and using the set of rules associated with the identified machine tool operations to generate control data in the form of a composite set of computer instructions for working the component represented in the computer model.

Using this method, a computer model of a component which contains information relating to particular geometric features can be analysed against a predefined set of rules for performing predetermined machine tool operations. The predefined set of rules effectively comprises a 'knowledge' database relating to particular machine tool strategies and the programming instructions required to put these strategies into effect. By identifying the features described in the component model, determining which machine tool operations are suitable for working those features, and then using the rules associated with those machine tool operations to select a tooling operation and to generate a suitable set of composite computer instructions representative of an overall tool operating strategy, these composite computer instructions can then be made available to an NC machine tool quickly and efficiently. The set of rules can be universal, i.e. they can relate to a large number of machine tool operations for many different NC machine tool types, or they can simply relate to more specialised types of machine tool operation. Provided these rules comprise the information necessary for automatically generating computer instructions from a computer model, the need for expensive and time consuming programming is greatly reduced. The system is less prone to human error, since the code output from the system relates to that which is input, namely the computer model. Provided that the computer model has been verified prior to being interrogated, then very few, if any, errors should result.

By embodying the steps of the method in a computer application, it will be appreciated that a complete 'black box' approach can be adopted. Such a black box approach has the advantage of enabling design modifications to be embodied quickly and efficiently without necessarily taking the machine tool offline. By simply changing the appropriate part of the computer model and applying the method again, a new set of data is obtained and the output can be analysed. The training of specialised personnel is also reduced.

It will be appreciated that references to 'geometric features' refer to features or characteristics of shape or configuration which are identifiable on the component. Typically, these features are three-dimensional in nature. Examples include bores, wells, fillets and ribs and other protrusions. The distance between particular features may also be regarded as a geometric feature of a component. It will also be appreciated that the term 'worked' covers manufacture of a component, i.e. by forming or shaping, for instance by milling, operating on a component using the NC tool, e.g by riveting or impacting by the NC tool.

Preferably, in the step of providing the computer model, a three-dimensional solid computer model specifying geometric features of the component is provided. This solid computer model can be acquired from a CAD application, such as Intelligent CAD (ICAD), or a text-based application such as the International Geometry Export Standard (IGES). It will be understood that the computer model may not specifically state or show particular geometric features, it being more likely that the geometric features will be defined in terms of the data forming the model. Indeed, in the case of the text-based IGES application, components are defined in the IGES language from which a 'mesh' representation can be formed. In the step of identifying the geometric features of the component to be worked, the mesh representation will be reconstructed and used in the identifying process.

The step of providing the set of rules may comprise: providing a database of geometric features, each feature having assigned to it one or more machine tool operations capable of working that respective feature; and providing a set of selection criteria for performing each machine tool operation, the step of generating a composite set of computer instructions comprising: matching each feature identified from the computer model with those specified in the database; and selecting a suitable machine tool operation for the or each feature based on analysis of the selection criteria. The step of providing the set of selection criteria may itself comprise: assigning sub-rules to one or more of the machine tool operations, the sub-rules specifying conditions for selecting the or each machine tool operation depending on the geometrical feature identified in the computer model. Indeed, this step may further comprise: assigning sub-rules to one or more of the machine tool operations, the sub-rules specifying further conditions for selecting the or each machine tool operation depending on the relative positions of a plurality of geometrical features identified in the computer model.

In the step of generating a composite set of computer instructions, the instructions may specify a suitable toolpath for the or each selected machine tool operation, the step of generating a composite set of computer instructions further comprising devising a suitable machine tool operation and toolpath strategy for working the component as a whole.

In one preferred embodiment, a computer model representing a first component for assembly to one or more further components is provided, the computer model specifying the geometric position of one or more assembly points of the first component. The computer model might represent a first component for being riveted to a second component, the computer model specifying the geometric position of one or more riveting points in the first component, and the generated set of computer instructions being NC instructions for performing a riveting operation at the riveting points specified in the computer model. The computer model can be representative of an aircraft wing stringer.

In a second preferred embodiment, a computer model representing a component to be produced from a blank is provided, the computer model specifying the desired shape or configuration of the component, the generated set of computer instructions being NC instructions for forming the component from the blank. In this case, the step of providing the set of selection criteria may further comprise assigning sub-rules to one or more of the machine tool operations for determining an appropriate rate or speed of machine tool operation depending on the material of the blank.

As mentioned above, in the step of providing the computer model, the specified geometric features might relate to one of more of a recess, hole or protrusion. The rules provided may relate to one or more of drilling, milling, cutting, turning or riveting operations.

The invention finds particular application where the computer model is representative of an aircraft component. In particular, the computer model can be representative of a wing stiffener.

According to a second aspect of the present invention, there is provided a computer program stored on a computer usable medium, the computer program comprising computer-readable instructions for causing the computer to execute the steps of: providing a predefined set of rules for performing predetermined machine tool operations, from which rules computer instructions can be derived for controlling an NC machine tool; analysing a computer model representing a component to be worked by the machine tool, the computer model specifying geometric features of the component; automatically identifying, from the computer model, the geometric features of the component and identifying one or more of the predetermined machine tool operations suitable for working the identified features of the component; and using the set of rules associated with the identified machine tool operations to generate a composite set of computer instructions for working the component represented by the computer model.

The control system may be configured to analyse and identify geometric features from a three-dimensional solid computer model representing the component. The stored rules may comprise a database including a plurality of geometric features and machine tool operations, each of the plurality of features having assigned to it one or more machine tool operations capable of working that feature, and wherein the database further comprises a set of selection criteria associated with each machine tool operation, the application program being configured to generate a composite set of computer instructions by matching each feature identified from the computer model with those specified in the database, and to select a suitable machine tool operation for the or each feature based on analysis of the selection criteria. The selection criteria can comprise sub-rules assigned to one or more of the machine tool operations, the sub-rules specifying conditions for selecting the or each machine tool operation depending on the geometric feature identified by the application program. The selection criteria can further comprise sub-rules specifying further conditions for selecting the or each machine tool operation depending on the relative positions of a plurality of geometric features identified by the application program.

The composite set of computer instructions generated by the application program can specify a suitable toolpath for the or each selected machine tool operation, thereby to form a suitable toolpath strategy for working the whole component.

The application program may be configured to analyse a computer model relating to a component for assembly to one or more other components. The application program may also be configured to analyse and recognise assembly points of the component and to generate suitable NC instructions for controlling a suitable assembly process. In this case, the application program can generate suitable NC instructions for controlling an NC riveting tool. The computer model may be representative of an aircraft wing stringer.

As an alternative to the above, the application program may be configured to analyse a computer model relating to a component to be produced from a blank of material, the application program identifying features of shape and configuration of the component, and to generate NC instructions for controlling a manufacturing process for forming the component from a blank of material. The selection criteria stored in the memory can include sub-rules for one or more of the machine tool operations for determining an appropriate rate or speed of machine tool operation depending on the material of the blank. The application program may be configured to identify geometrical features relating to one of more of a recess, hole or protrusion. The stored rules may relate to one or more of drilling, milling, cutting, turning or riveting operations. The computer model may be representative of an aircraft component, for example, a wing stiffener.

According to a third aspect of the present invention, there is provided a control system for a numerically-controlled (NC) machine tool, the control system comprising: a memory storing a predefined set of rules for performing predetermined machine tool operations, from which rules computer instructions can be derived for controlling the NC machine tool; and an application program for analysing an inputted computer model representing a component to be worked by the machine tool, the application program being configured (i) automatically to analyse and identify geometric features of the component in the computer model, (ii) to identify one or more of the predetermined machine tool operations suitable for working the identified features of the component; and (iii) to generate a composite set of computer instructions on the basis of the rules associated with the identified machine tool operations, the composite set of computer instructions being suitable for working the component represented in the computer model.

As mentioned above, such a system effectively provides a black box into which a computer model can be input, and from which a set of NC control data can be obtained. The knowledge required to generate this NC control data from the computer model is stored in a database. The system readily responds to changes in input and so facilitates design flexibility.

Preferred features relating to the above system can be found in the appended set of claims.

The invention will now be described, by way of example, with reference to the accompanying drawings, in which.

Figure 1:
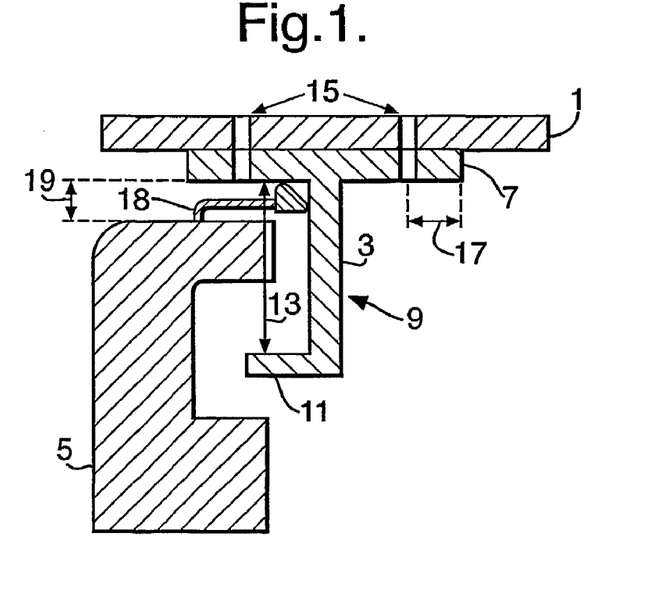
FIG. 1 is a cross-sectional view of a wing skin and stringer assembly and part of a riveting tool.

A preferred method according to the present invention is described with reference to FIG. 1. Referring to FIG. 1, a wing skin 1 and stringer assembly 3 is shown, positioned over a lower anvil part 5 of a so-called Low Voltage Electromagnetic Riveting (LVER) tool. The LVER tool is well-known in the aerospace industry and is commonly used to fasten wing skins to an underlying stringer assembly on the basis of NC programming instructions. In terms of size, the LVER tool is very large and is capable of attaching many thousands of fasteners to secure aircraft wing components together. Accordingly, the time and expense required in programming a control system of the tool is also large.

As shown in FIG. 1, the stringer assembly 3 comprises a stringer flange 7 for forming an attachment interface with the wing skin 1. Extending perpendicularly from the stringer flange 7 is a stringer web 9 which terminates at a distal edge with a stringer crown 11, extending perpendicularly at one side thereof. The space between the stringer crown 11 and a bottom face of the stringer flange 7 is referred to as the stringer throat 13. In FIG. 1, two fastener locations 15 are shown for attaching the wing skin 1 to the stringer flange 7.

The distance from the edge of the stringer flange 7 to the centre of each fastener location 15 is referred to as the edge distance 17.

The lower anvil part 5 of the LVER tool includes a tracer mechanism 18 which forms a contact for controlling the distance of a fastener from an edge of the stringer web 9 and the placement of the lower anvil within the stringer throat 13. The tracer mechanism 18 also acts as a checking mechanism in order to take account of any build up of manufacturing tolerances on the assembled components. A so-called 'flying height' 19 is also defined as the distance between the lower anvil part 5 and the stringer throat 13. It will be clear from FIG. 1 that there is restricted space in which the lower anvil part 5 has to be positioned in certain areas of the overall wing structure.

The LVER machine tool requires programming instructions to be supplied from a control system (not shown). These instructions include details of a five-axis position to define each fastener location 15, and also a further three axes in order to control positions and rotations of the machine head of the LVER tool. A further two dimensions are required to set the tracer mechanism 18, which, as mentioned above, is used to check the location of a fastener from the edge of the stringer web and the flying height 19 of the lower anvil part 5 relative to the stringer throat 13.

In conventional methods of generating NC control data for such LVER machine tools, extensive manual calculation and data input is required. This is mainly due to the presentation of design data in the form of paper drawings. Typically, the distance of a fastener from the edge of a stringer is critical to the programming operation and this positional value is generally shown on the paper drawings of the stringer assembly. However, since, in operation, the mechanical tracer 18 touches the stringer web 9 (not the stringer edge) the value for setting the tracer has to be manually calculated from the following equation:

Tracer Offset=Flange Width/2−(Edge Distance+Web Thickness/2)

This equation has to be calculated and programmed for each fastener which demonstrates why the conventional process is time-consuming and prone to human error.

It will also be appreciated that, in order for the lower anvil part 5 (in this case, on the so-called 'stringer side' of the stringer assembly) to be driven to each fastener location 15, a dogleg motion is required in order to avoid collision of the anvil part with the stringer crown 11. Knowledge of the stringer crown widths and web dimensions combined with the lower anvil part 5 sizes is required to provide for clearance without hitting the back of the lower anvil part 5 on the adjacent stringer assembly 3. Again, conventional techniques require manual calculation and programming of control system software.

In a preferred method in accordance with the invention, a control program is provided for the control system, for automatically generating NC control data for the LVER tool. The control program includes an acquired computer model representing certain geometrical features of the components to be worked on, in this case, the stringer assembly 3, the fasteners, and the holes for the fasteners. This computer model can include solid model representations of one or more components, designed and/or provided in a CAD package such as CADDS5.

In producing the computer model for this particular case, each fastener location 15 is represented by an individual 'tag' name such that a series of text-files are then created in a design stage, these text files holding the cross-sectional dimensions of the assembled components at each fastener location. Such text files are then made accessible to other programming elements, such as macros and subroutines within the control program. These macros and subroutines define rules for generating NC control data according to the text files. A refinement of this is to utilise non-geometric properties which are available as associated data for entities stored in the CADDS5 software.

The concept of using such a computer model for controlling the LVER tool allows optimisation of the computational aspects of the control program in that the program merely has to access numeric values in the text files, which are essentially attached to the computer model of the various wing assembly components, detailed above. The control program effectively interrogates the computer model to determine the geometrical features are present, and then formulates appropriate NC programming instructions for causing the LVER machine tool to perform its required operation. In generating a set of NC programming instructions from the control program, all calculations can be made prior to the actual NC programming phase instead of calculating various cross-sectional dimensions across a number of assembled components in real time.

In order to generate the text files for interrogation by the control program, the LVER machine tool capabilities have to be well understood and incorporated in the control program. The knowledge of the tool capabilities acquired is used to define computer-based rules for performing different machine tool operations, such as controlling the movement of the machine tool head between different fastener locations and the actual fastening (riveting) operation. The rules also define a desired assembly fastening strategy of the LVER machine tool. By combining the computer based rules (defining the machine capabilities and strategy) with the computer model of the wing structure, a set of further rules are identified. These further rules take into account each individual skin 1 to stringer configuration 3 at each fastener location 15. For example, since stringer assemblies taper at their ends, there are areas on the wing where no stringer crown 11 and even no stringer web 9 are present, this being reflected by the further rules. These further rules are then embedded in an Intelligent CAD (ICAD) software tool to generate so-called 'attributes' relating to each fastener location.

It will be appreciated that the ICAD software tool is a known software application which enables the building of software applications for automating engineering applications.

Thus, by providing a set of operating rules based on knowledge of the different capabilities of the LVER machine tool and a desired fastening strategy, and combining these rules with a computer model of the components to be worked on, a further set of rules are generated to form the set of 'attributes' using the ICAD tool. These attributes are then exported back to the CADDS5 software to form a so-called 'intelligent' CAD model.

Figure 2:
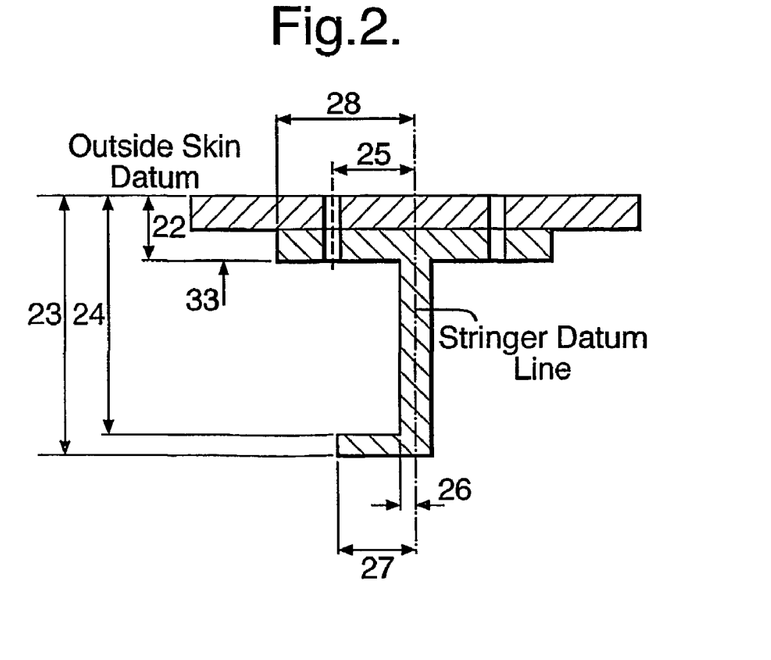
FIG. 2 is a cross-section of the wing skin and stringer assembly of FIG. 1, including ICAD attributes.
Figure 3:
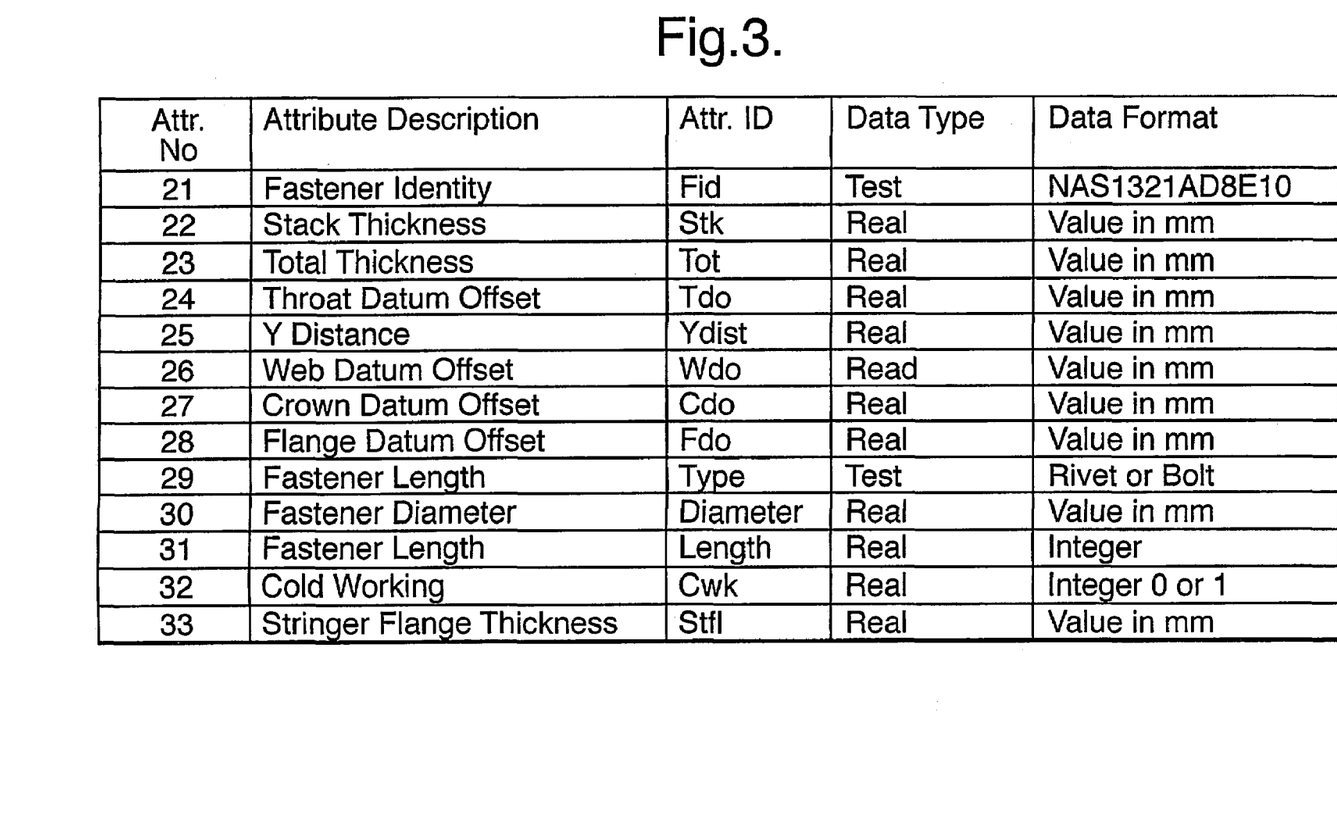
FIG. 3 is an attribute table detailing certain attributes, as shown in FIG. 2.

In the case where the computer model is a wing assembly for an Airbus A340-600, for example, thirteen attributes for each of the 110,000 fasteners present on the wing are generated from the ICAD tool. FIG. 2 shows the skin 1 and stringer assembly 3 with eight of the thirteen attributes illustrated. FIG. 3 is a table giving full details of all thirteen attributes. The attributes are essentially generated by forming a virtual line normal to the wing surface at each fastener location giving the length of the assembled stack (see attribute 2 in FIG. 3), together with a solid CADDS5 model of the stringer assembly 3. Using this information, an ICAD routine is then used to analyse a cross-section of the stringer assembly 3 at each faster location 15, to measure certain specific dimensions, and then to combine this data with the computer model of the fastener and the hole to generate the attributes.

Of the thirteen attributes generated by ICAD, eight provide measurements calculated from the analysis of the cross-section of the stringer assembly 3. These eight attributes are those shown in FIG. 2. The remaining five attributes record the fastener dimensions and their type, together with properties of the holes into which the fasteners are to be placed, i.e. whether or not the hole is cold worked (using a sleeve and pull-through mandrel to strengthen the material microstructure around the hole).

Having created the thirteen attributes, a CADDS5 user interface is created. This allows easy access to the attribute data and also to that of the machine tool, so as to enable easy and efficient creation of the NC instructions for controlling the LVER machine.

Having established the method for generating the attributes, and the control program configured to analyse the computer model of the components, the remaining task is to program the NC machine tool efficiently and effectively. This is performed by means of the control program interpreting the attributes assigned to each fastener location 15 (most of which relate to geometrical features of the wing assembly to be worked) and accessing a set of predefined control rules for generating suitable NC instructions defining the movement and operation of the machine tool head of the LVER tool. The control rules also allow a warning to be issued to an NC programmer as to possible access and/or collision problems associated with a particular fastener location 15.

The predefined control rules comprise a series of subroutines (or exceptions) made available for selection based on the identified attributes at each fastener location 15, and, in response to their selection, the control program outputs the NC control data, including data relating to machine axis and head control statements. The subroutines have to be robust to react to the differing cross-section profiles so as to be applicable to each different fastening locations 15 over the wing structure. The subroutines also have to be capable of detecting when a particular fastening location 15 does not have any associated attribute data and so reset accordingly.

By using dimensions acquired from three-dimensional models of the LVER lower anvil 5, in conjunction with the attribute data for each fastener (or fastener location 15) the subroutines can include formulae which are defined to give clearance values for raising and lowering the stringer side tooling. Additional formulae can be incorporated in the subroutines to enable a tracer offset value to be automatically included for each fastener or fastener location 15. By using knowledge of the lower anvil 5 and stringer dimensions, it is possible to determine where certain types of anvil may, or may not, fit, giving a form of real-time collision checking which greatly reduces the time required for test purposes (sometimes referred to as 'tape try-out').

In practice, the system is successfully employed to the extent that 'balancing' of the lower anvil position to 1 mm clearance is achievable and continues to run in a production environment. Of course, however, the usual limitations apply as in all CAD based systems, in that all accessible attribute data is at nominal dimension and so care must be taken to account for possible tolerance build-ups during the creation of the subroutines.

In respect of the present embodiment, the benefits included: (a) a 90% saving in NC programming time, compared with that of manual programming; (b) the facility to incorporate design changes with a 90% time saving compared with the manual programming method; (c) an 85% reduction in 'tape try-out' time; and (d) reducing rework time by over 90%.

Figure 4:
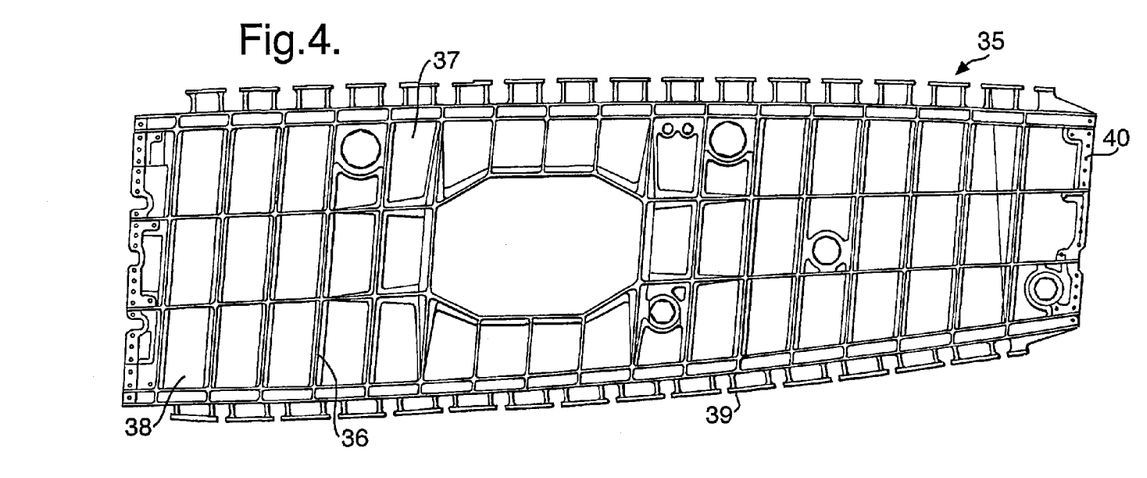
FIG. 4 is a plan view of an interspar rib component for manufacture using a set of control data generated from a control system in accordance with the invention.

A second embodiment of the present invention will now be described with reference to FIGS. 4 to 11. In this embodiment, a further control system generates NC control data for manufacturing a mechanical component, namely an interspar rib for an aircraft wing, from a blank billet of material. FIG. 4 is a diagram showing the interspar rib (in its finished form). The interspar rib 35 comprises a number of geometric features including stiffener ribs 36, wells 37, pockets 38, feet 39 and holes 40.

Figure 5:
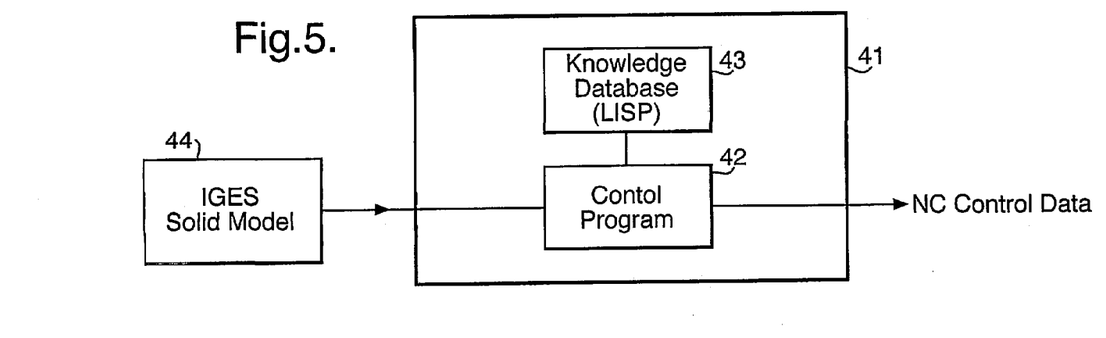
FIG. 5 is a block diagram of a control system used in manufacture of the component of FIG. 4.

FIG. 5 is an overview block diagram of the control system 41. The control system 41 comprises a control program 42 which accesses a stored 'knowledge' library or database 43 holding predefined data relating to particular machine tool strategies (explained in more detail below). The knowledge database 43 is programmed using the known programming language LISP. LISP is an object-oriented programming language which is especially useful for defining 'knowledge-based' engineering operations.

In use, a solid model 44 of the component to be manufactured is input to the control program 42. The solid model 44 is a virtual component in the sense that it is a set of stored data and, in this case, is in the form of IGES data. As will be appreciated by those skilled in the art, IGES is a known software standard capable of defining geometric features of mechanical components and objects. It should also be appreciated, however, that other CAD packages can be used to export solid model data for the component. In this case, the IGES data represents a computer model 44 of the interspar rib component 35 shown in FIG. 4.

In operation, the control program 42 performs a feature recognition operation on the IGES data to identify, amongst other attributes, the geometric features present in the solid model 44 of the interspar rib component 35. In using the IGES model 44, such features are defined in a numerical form (the numerical model itself usually having been tested and verified) and so the feature recognition operation is not subject to errors often incurred during manual programming.

Having identified the features present in the solid model 44, and their relative locations in the model, the control program 42 operates to generate the NC control data by developing a suitable machining strategy for producing the various features making up the overall component 35. This strategy is developed according to the LISP knowledge database 43 mentioned above, the knowledge library storing a set of rules for performing particular machine tool operations depending on the features identified in the IGES solid model 44, their relative position within the billet of material (i.e. the solid blank of metal from which the interspar rib is produced) and the position of other geometric features relative to each 'subject' feature. Having developed a suitable strategy according to all of the identified features, a complete set of NC control data for producing the component is generated and can be fed to an NC machine tool.

As briefly mentioned above, the LISP knowledge database 43 comprises a library of predefined rules for performing particular machine tool operations, from which rules can be derived actual computer instructions for controlling a suitable NC machine tool or tools. The rules are conditional, i.e. the control data output is determined by the data entered to form the IGES solid model 44. The rules effectively fall into two main categories, namely (i) machine feature rules and (ii) design feature rules.

The machine feature rules relate to the top-level, generalised strategy of the NC machine tool operation and are generally more particular to the type of component being worked on, in this case the interspar rib 35. As an example, the type of material from which the billet is formed will determine the correct tooling speed for each different machine tool operation. Thus, if the control program determines from the IGES model 44 of the interspar rib 35 that it is to be made in aluminium, the machine feature rules will determine and dictate the appropriate tooling speed for that particular material. Other machine feature rules can include the placement and drilling of tooling and clamping holes for fixing the billet to the tooling, and the appropriate point in the machining procedure at which the billet is to be moved, i.e. flipped-over or oriented differently.

The design feature rules relate to strategies for forming particular geometric features in an appropriate and efficient manner. These rules can be more 'universal' in that they can be used to generate control data for any component having such geometric features, although in the present case, they are only used for forming particular features of the interspar rib 35. The control program 42, having identified a feature which is to be formed in the billet of material, accesses the design feature rules which comprise a set of conditions for determining how (and when) the machine tool will form that feature. Such rules not only have to take into account the size, shape and position of each feature to be formed, but also any other geometric feature which is located adjacent to that feature. In many cases, a feature may not be formed until a different feature is first completed. In effect, the design feature rules are arranged as a hierarchy of conditional rules for determining an appropriate machine tool strategy. The overall set of NC control data generated is based on a combination of the machine feature rules and the design feature rules.

A brief overview of a few main steps involved in deriving the machine tool strategy for the interspar rib of FIG. 4 will now be described with reference to FIGS. 6 to 9 and FIG. 11. It will be appreciated that these steps represent a fraction of the stages actually taken by the control program 42, and are intended to be illustrative. It should also be understood that these Figures do not represent the inputted IGES computer model 44, but actually show simulated output of what the NC machining tool produces in accordance with the NC machining instructions being generated by the control program 42. In this case, an application program VeriCut (TM) has been used to produce the simulated output.

In practice, the overall machine tool strategy for generating the component is broken down into so-called 'stages' and 'operations'. A 'stage' represents work performed on a given face of the billet, whilst an 'operation' is a sequence of work carried out from the introduction of a particular tool up to the point when that tool is changed for another tool. It follows, therefore, that the machine tool strategy can further be defined in terms of the tools required and the description of the tool action within each operation.

On inputting the IGES computer model 44 to the control program 42, the relevant machine feature rules are identified to generate the first set of machine tool operations. As mentioned previously, these machine feature rules form a top-level strategy and are based on considerations such as the dimensions of the billet, the material of the billet, and a set of requirements relating to how the billet is secured on the machine tool. The dimensions and material of the billet are inputted from the computer model 44, and the knowledge database 43 uses this information to determine how to secure the billet, and the appropriate speed range of the tool for all future machining operations.

Figure 6:
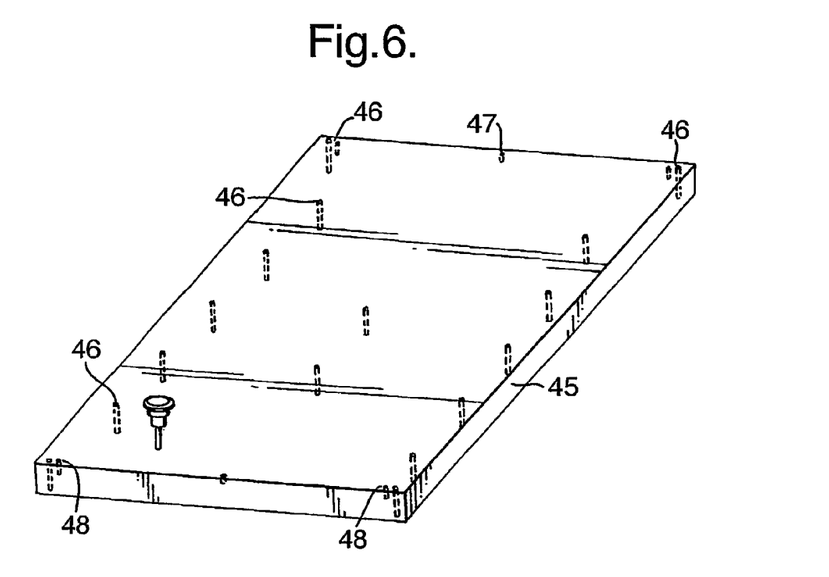
FIGS. 6 to 9 are computer graphical representations of a billet of material at successive stages in the machining of the component of FIG. 4, the representations being generated in a simulation application using the NC data from the control system of FIG. 5.

In the first operation, i.e. stage #1, operation #1, the billet is located on a table of the machine tool and is either clamped or held on a vacuum chuck. The purpose of the operation is to prepare a first side (side one) of the billet by removing the so-called 'dead-zone' of unwanted stock to create a flat reference surface. Accordingly, the control program 42 generates control data for performing this task, including generating the necessary data for selecting and picking up a milling tool and for controlling its speed of milling. In operation #2, central tooling holes and clamping holes will be drilled, and so the operation for picking-up the drilling tool and the required operating speed and toolpath is generated. These holes are used to secure the billet firmly to the machine tool fixture/bed. FIG. 6 shows a billet 45 with the clamping holes 46 and tooling holes 47 included. Lifting holes 48 are also provided.

Control data for a number of further operations are generated by the control program 42. These operations are performed once the billet 45 is secured to the machine tool fixture/bed and are generated using the design feature rules, which, as explained above, relate to the particular geometric features which make up the interspar rib 35 shown in FIG. 4.

Figure 7:
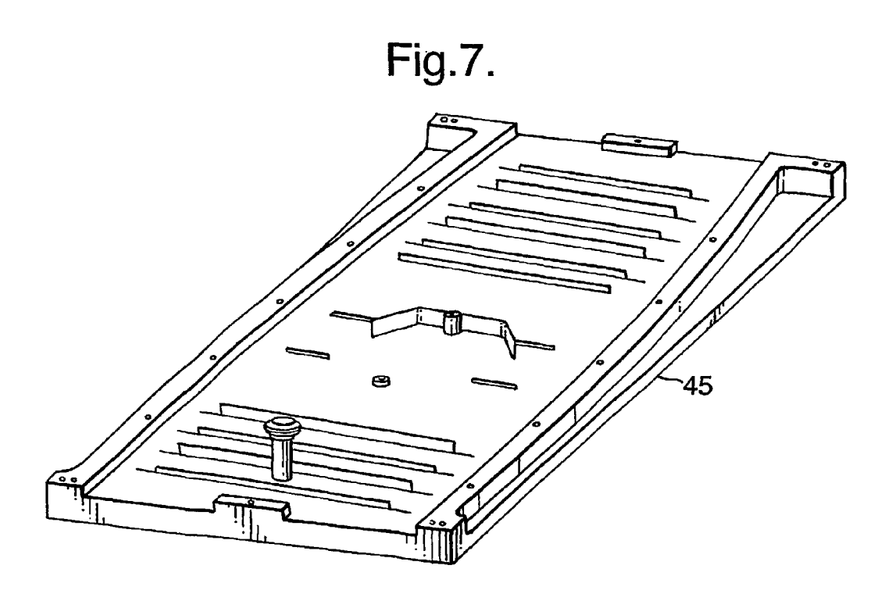
Figure 8:
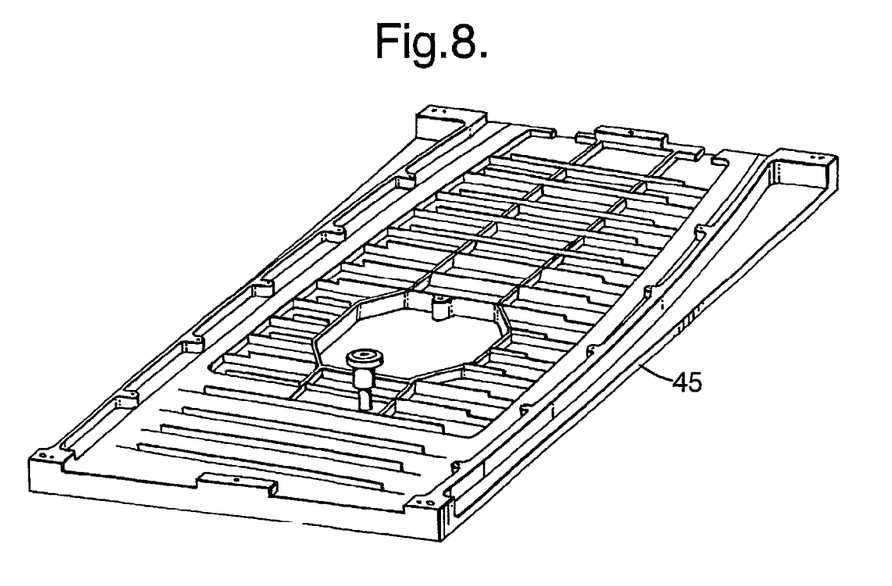

As would have been clear from FIG. 4, the control program devises a machine tool strategy for producing a number of complex geometrical features, e.g. "holes" 40, "feet" 39, "pockets" 38, "stiffeners" 36". FIGS. 7 and 8 represent intermediate stages of the formation of one side of the interspar rib 35. In analysing the computer model 44 of the interspar rib 35, the identified geometric features are compared with the design feature rules predefined in the LISP knowledge database 43. These design feature rules effectively comprise a hierarchy of conditional rules for determining which machine tool operations are suitable for producing or operating on a particular feature, and additionally, how each feature should be produced or operated on, conditional on other factors. These other factors may include the position of adjacent features.

To illustrate the principle of the design feature rules, the top level rules define the actual feature, i.e. "holes", "apertures", "feet", "pockets", "stiffeners", "walls" etc. Associated with each feature is one or more tooling types e.g. drilling, milling etc. which can be used to produce that feature. Thus, when a well is identified in the model, the control program accesses the LISP knowledge database and identifies the tooling types which can be used to produce the well. Sub-rules are provided which define conditions for determining which tool to use, i.e. milling tool if the well is wide and shallow, or drilling tool if the well is relatively narrow and deep. Other more complex sub-rules are provided in order to determine the time (in the course of the overall strategy) at which each machine tool operation will be performed. These sub-rules generally relate to the location of other features. For example, the IGES computer model may require a hole to be provided at the bottom of a deep well. Thus, a sub-rule may be provided which stipulates that, in such circumstances, the well is to be milled prior to the drilling of the hole in the bottom of that well. It follows that a whole 'tree' of sub-rules with many levels can be predefined in the LISP knowledge database, stipulating many such conditional statements for generating a suitable strategy.

Figure 9:
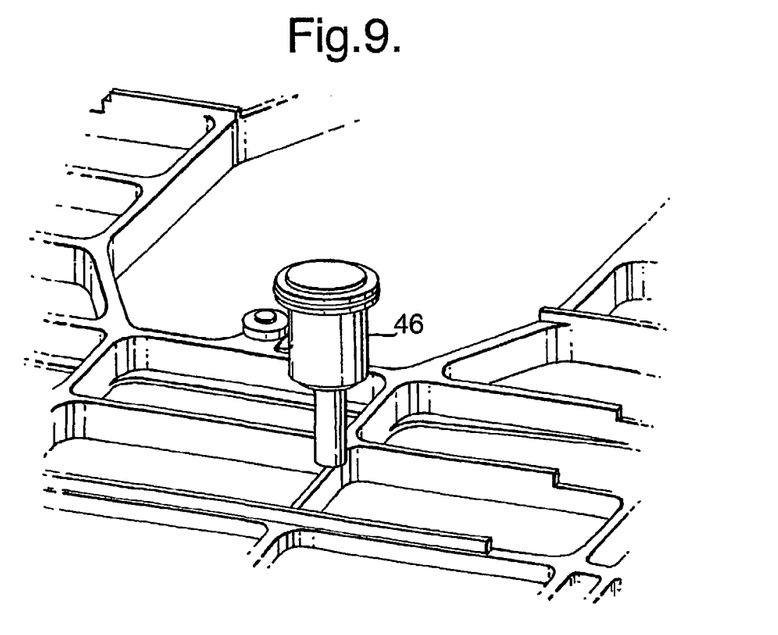

Having generated control data for machining the interspar rib 35 up to the stage shown in FIG. 8, data for performing 'finishing' operations is generated. FIG. 9 shows such a finishing operation being performed on the walls of a pocket 38 using tool 46.

Having generated control data for finishing side one of the interspar rib 35, the machine feature rules will stipulate that the billet 45 is to be flipped so that work can be performed in Stage #2, i.e. on side two of the interspar rib 35. As with side one, the design feature rules are then used to generate a suitable machine tool strategy for producing the geometric features of side two.

Figure 10:
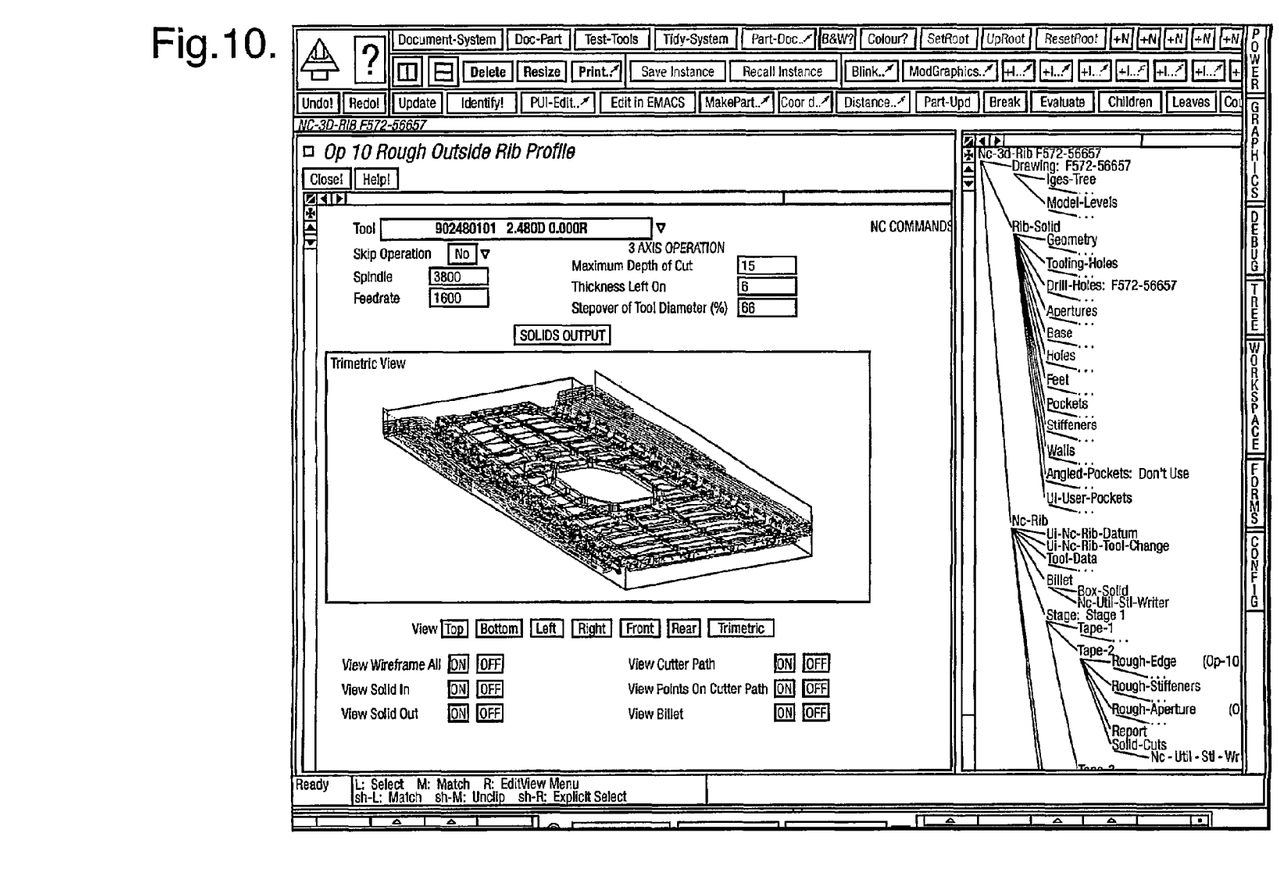
FIG. 10 is a screen capture of a Graphical User Interface (GUI) for monitoring a machine tool operation simulation using NC control data generated by the control system of FIG. 5.

FIG. 10 is a screen capture showing a Graphical User Interface (GUI) for use in monitoring the progress of a simulation. Here, an intermediate stage of the control program operation is shown. As can be seen from the right-hand part of the screen capture, the machine and design feature rules (at least at the top level) are shown, which rules can be expanded to show the underlying sub-rule hierarchy.

Figure 11:
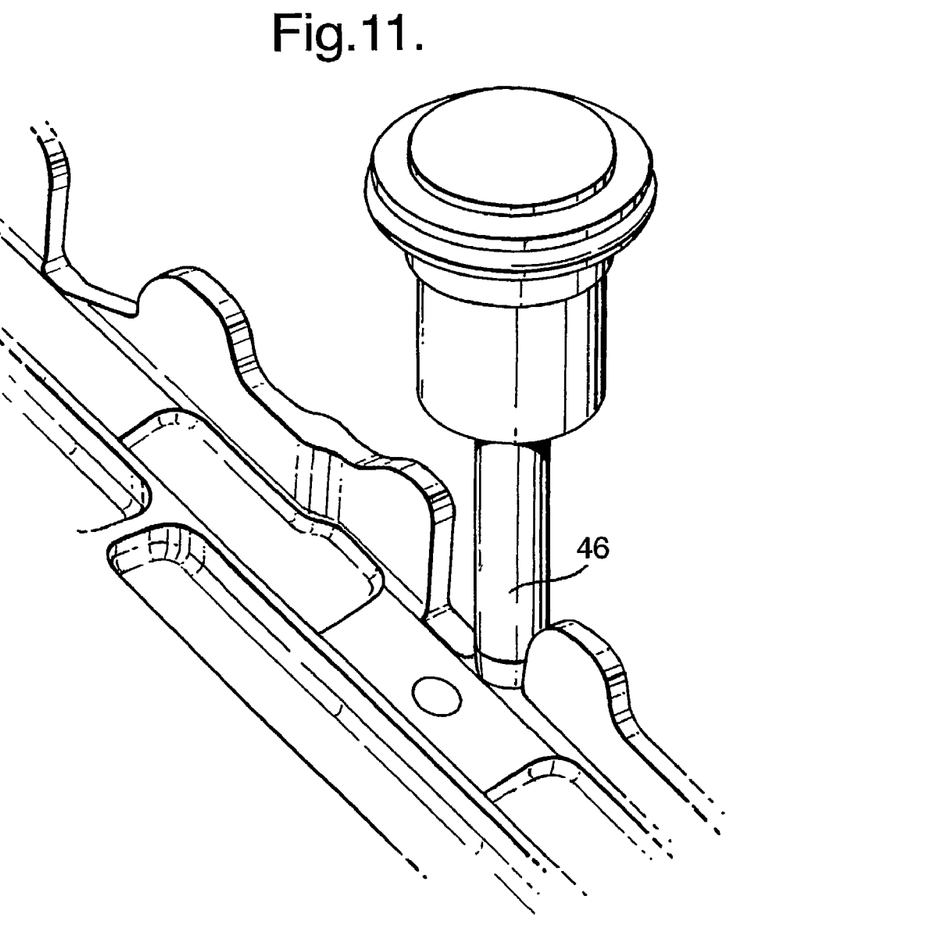
FIG. 11 is a further graphical representation generated by the simulation application using the NC control data generated by the control system of FIG. 5.

In the final stage, rib feet are formed on the edges of the interspar rib, as shown in FIG. 11.

Whilst the above described second embodiment is essentially an automatic procedure, i.e. the computer model 44 is input to the control program, and a set of NC control data is automatically generated, it is possible to include a degree of user interaction. For example, a user may be prompted to override the automatic selection of the tooling type (in relation to the design feature rules) to choose their own tooling type.

In conclusion, both embodiments provide a system which receives a computer model of a component to be manufactured, and from which a set of NC control data suitable for producing, or working features represented in that computer model. Such a 'black box' system readily responds to changes in input and facilitates rapid implementation of design changes.

The invention claimed is:

1. A method of generating control data for a numerically-controlled (NC) machine tool, the method comprising the steps of:
   providing a predefined set of rules for performing predetermined machine tool operations, and deriving computer instructions for controlling the NC machine tool from said set of rules;
   providing a computer model representing a component to be created by the machine tool, the computer model including a database of geometric features of the component;
   automatically identifying, from the computer model, geometric features of the component, and automatically identifying one or more of the predetermined machine tool operations for creating the identified features in the component; and
   generating, using the set of rules associated with, the identified predetermined machine tool operations, NC control data in the form of a set of computer instructions for creating the component represented in the computer model, said generating step comprising devising a machine tool operation and toolpath strategy for creating the component, said method steps implemented on a computer system.

2. A method according to claim 1, wherein, in the step of providing the computer model, a three-dimensional solid model specifying geometric features of the component is provided.

3. A method according to claim 2, wherein, in the step of providing the computer model, a three-dimensional component description is acquired from a computer-aided design (CAD) application.

4. A method according to claim 1, wherein the step of providing the set of rules comprises: providing a database of geometric features, each feature being assigned to one or more machine tool operations capable of working that respective feature; and providing a set of selection criteria for performing each machine tool operation, the step of generating a composite, set of computer instructions comprising: matching each feature identified from the computer model with those specified in the database; and selecting a suitable machine tool operation for each feature based on analysis of the selection criteria.

5. A method according to claim 4, wherein the step of providing the set of selection criteria comprises: assigning sub-rules to one or more of the machine tool operations, the sub-rules specifying conditions for selecting each machine tool operation depending on the geometric feature identified in the computer model.

6. A method according to claim 5, wherein the sub-rules specify further conditions for selecting each machine tool operation depending on the relative positions of a plurality of geometric features identified in the computer model.

7. A method according to claim 1, wherein the computer model represents a first component for assembly to one or more further components, the computer model including information relating to the geometric position of one or more assembly points of the first component.

8. A method according to claim 7, wherein the computer model represents said first component for assembly by riveting to a second component, the computer model including information relating to the geometric position of one or more riveting points in the first component, the generated set of computer instructions being NC instructions for performing a riveting operation at the riveting points specified in the computer model.

9. A method according to claim 7, wherein the computer model is representative of an aircraft wing stringer.

10. A method according to claim 7, wherein, in the step of providing the computer model, the geometric features included in the model relate to the distance between assembly points on the first component.

11. A method according to claim 1, wherein a computer model representing a component to be produced from a blank is provided, the computer model specifying a desired shape or configuration of the component, the generated set of computer instructions being NC instructions for forming the component from the blank.

12. A method according to claim 11, including the step of providing a set of selection criteria for performing each machine tool operation which includes assigning sub-rules to one or more of the machine tool operations for determining an appropriate rate or speed of machine tool operation depending on the material of the blank.

13. A method according to claim 11, wherein, in the step of providing the computer model, the geometric features included in the model relate to one of more of a recess, hole or protrusion.

14. A method according to claim 1, wherein the rules relate to one or more of drilling, milling, cutting, turning or riveting operations.

15. A method according to claim 1, wherein the computer model is representative of an aircraft component.

16. A method according to claim 15, wherein the computer model is representative of a wing stiffener.

17. A computer program product stored on a non-transitory computer readable storage medium, the computer program product comprising computer-readable instructions for causing said computer system to execute the steps of a method according to claim 1.

18. A method of manufacturing a component using said numerically-controlled machine tool, including generating control data for a machine tool in a manner according to claim 1.

19. A control system for a numerically-controlled (NC) machine tool, the control system comprising:

a memory device storing a predefined set of rules for performing predetermined machine tool operations, a database of geometric features and deriving computer instructions for controlling the NC machine tool from said set of rules; and an application program for analysing an inputted computer model representing a component to be created by the machine tool, the application program being configured to:
  (i) automatically analyse and identify geometric features of the component in the computer model using said database,
  (ii) automatically identify one or more of the predetermined machine tool operations for creating the identified features of the component; and
  (iii) to generate a composite set of computer instructions on the basis of the rules associated with the identified machine tool operations, the composite set of computer instructions comprising devising a machine tool operation and toolpath strategy for creating the component.

20. A method of generating control data for a numerically-controlled (NC) machine tool, the method comprising the steps of:
  (a) providing a predefined set of rules for performing predetermined machine tool operations, a database of geometric features and deriving computer instructions for controlling the NC machine tool from said set of rules;
  (b) providing a computer model representing a component to be worked by the machine tool, the computer model including information relating to geometric features of the component, wherein the computer model represents a first component for assembly to one or more further components, the computer model including information relating to the geometric position of one or more assembly points of the first component, each assembly point comprising a point at which the first component is assembled to said one or more further components;
  (c) automatically identifying, from the computer model and said database, geometric features of the component, and automatically identifying one or more of the predetermined machine tool operations suitable for working the identified features of the component; and using the set of rules associated with the identified machine tool operations to generate control data in the form of a composite set of computer instructions for working the component represented in the computer model, said method steps implemented on a computer system.

21. A method according to claim 20, wherein the computer model represents a first component for riveting to a second component, the computer model including information relating to the geometric position of one or more riveting points in the first component, the generated set of computer instructions being NC instructions for performing a riveting operation at the riveting points specified in the computer model.

22. A method according to claim 20, wherein the computer model is representative of an aircraft wing stringer.

23. A method according to claim 21, wherein, in the step of providing the computer model, the geometric features included in the model relate to the distance between assembly points on the first component.

24. A method of controlling a plurality of numerically controlled machine tools for carrying out a plurality of sequential operations on an aircraft wing part, the method comprising the steps of:
  (a) providing a pre-defined set of rules for performing pre-determined machine tool operations, and deriving computer instructions for controlling the plurality of NC machine tools from said set of rules;
(b) providing a computer model representing the aircraft wing part to be worked on by the machine tools, the computer model including information relating to geometric features of the component;
(c) wherein the step of providing the set of rules comprises: providing a database of geometric features, each feature being assigned to one or more machine tool operations capable of working that respective feature; and providing a set of selection criteria for performing each machine tool operation, the step of deriving computer instructions comprising: matching each feature identified from the computer model with those specified in the database; and selecting a suitable machine tool operation for each feature based on analysis of the selection criteria;
(d) defining a sequence of operations, each operation relating to a specific machine tool procedure representing a sequence of work carried out from the introduction of the respective machine tool up to the point where the tool is changed for a subsequent tool, said method steps implemented on a computer system.

25. A method according to claim 24, wherein the step of providing the set of selection criteria comprises: assigning sub-rules to one or more of the machine tool operations, the sub-rules specifying conditions for selecting each machine tool operation depending on the geometric feature identified in the computer model.

26. A method according to claim 25, wherein the step of providing the set of selection criteria further comprises: assigning sub-rules to one or more of the machine tool operations, the sub-rules specifying further conditions for selecting each machine tool operation depending on the relative positions of a plurality of geometric features identified in the computer model.

27. A method according to claim 24, wherein a computer model representing a component to be produced from a blank is provided, the computer model specifying a desired shape or configuration of the component, the generated computer instructions being NC instructions for forming the component from the blank.

28. A method according to claim 27, wherein, in the step of providing the computer model, the geometric features included in the model relate to one or more of a recess, hole or protrusion.

29. A method according to claim 24, wherein the rules relate to one or more of drilling, milling, cutting, turning or riveting operations.

30. A method of generating control data for a numerically-controlled (NC) machine tool, the method comprising the steps of:
(a) providing a predefined set of rules for performing predetermined machine tool operations;
(b) providing a computer model representing a component to be worked by the machine tool, the computer model including information relating to geometric features of the component;
(c) automatically identifying, from the computer model, geometric features of the component and automatically identifying one or more of the predetermined machine tool operations suitable for working the identified features of the component;
(d) generating, using the set of rules associated with the identified machine tool operations, control data in the form of a composite set of computer instructions for working the component represented in the computer model with the machine tool;
(e) wherein the step of providing the set of rules comprises providing a database of geometric features, each feature being assigned to one or mere machine tool operations capable of working that respective feature; and providing a set of selection criteria for performing each machine tool operation, the step of generating a composite set of computer instructions comprising: matching each feature identified from the computer model with those specified in the database; and selecting a suitable machine tool operation for each feature based on analysis of the selection criteria; and
(f) wherein, in the step of generating a composite set of computer instructions, the instructions specify a suitable toolpath for each selected machine tool operation, said method steps implemented on a computer system.

31. A method according to claim 30, wherein the step of providing the set of selection criteria comprises: assigning sub-rules to one or more of the machine tool operations, the sub-rules specifying conditions for selecting each machine tool operation depending on the geometric feature identified in the computer model.

32. A method according to claim 31, wherein the step of providing the set of selection criteria further comprises: assigning sub-rules to one or more of the machine tool operations, the sub-rules specifying further conditions, for selecting each machine tool operation depending on the relative positions of a plurality of geometric features identified in the computer model.

33. A method according to claim 30, wherein a computer model representing a component to be produced from a blank is provided, the computer model specifying a desired shape or configuration of the component, the generated set of computer instructions being NC instructions for forming the component from the blank.

34. A method according to claim 33, wherein, in the step of providing the computer model, the geometric features included in the model relate to one of more of a recess, hole or protrusion.

35. A method according to claim 30, Wherein the rules relate to one or more of drilling, milling, cutting, turning or riveting operations.

36. A method according to claim 30, wherein the computer model is representative of an aircraft component.

37. A method according to claim 36, wherein the computer model is representative of a wing stiffener.

38. A method of generating control data for controlling at least one numerically-controlled (NC) machine tool in order to create a component having a plurality of geometric features, said method comprising the steps of:
providing a computer model of said component;
identifying and locating the geometric features of said computer model of said component;
responsive to said identifying and locating step, reviewing a knowledge database to (1) identify machine tool operations needed to create the geometric features of said component and (2) identify rules regarding use of said machine tool operations;
devising a machine tool strategy, said strategy comprising a series of NC machine tool operations, for creating a component with said geometric features, each machine tool operation identifying at least one NC machine tool and a needed tool path for said at least one NC machine tool to create at least a portion of one of said geometric features; and generating, from said machine tool strategy, control data for controlling said at least one NC machine tool for production of said component, said method steps implemented on a computer system.

39. A method of controlling a low voltage electromagnetic riveter (LVER) numerically controlled machine tool for carrying out a plurality of riveting operations on an aircraft wing part, the method comprising the steps of:
- a) providing a predefined set of rules for performing predetermined machine tool operations, and deriving from said set of rules computer instructions for controlling said machine tool;
- b) providing a computer model representing the aircraft wing part to be worked by the machine tool, the computer model including information relating to geometric features of the aircraft wing part;
- c) providing a plurality of files and associating each file with a specific geometric point of the computer model, each file containing information relating to one of the riveting operations to be carried out be the LVER, and said information including positional information for the riveting operation;
- d) identifying from the computer model and said files the required machine tool operations for carrying out said plurality of riveting operations; and
- e) using the set of rules associated with the identified machine tool operations to generate control data in the form of a composite set of computer instructions for carrying out riveting operations on the aircraft wing part represented in the computer model, said method steps implemented on a computer system.

* * * * *